US009305189B2

(12) United States Patent
Mraz et al.

(10) Patent No.: US 9,305,189 B2
(45) Date of Patent: *Apr. 5, 2016

(54) RUGGEDIZED, COMPACT AND INTEGRATED ONE-WAY CONTROLLED INTERFACE TO ENFORCE CONFIDENTIALITY OF A SECURE ENCLAVE

(75) Inventors: Ronald Mraz, South Salem, NY (US); Steven Staubly, Newton, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 1119 days.

This patent is subject to a terminal disclaimer.

(21) Appl. No.: 12/760,162

(22) Filed: Apr. 14, 2010

(65) Prior Publication Data

US 2012/0030768 A1 Feb. 2, 2012

Related U.S. Application Data

(60) Provisional application No. 61/212,738, filed on Apr. 14, 2009, provisional application No. 61/212,742, filed on Apr. 15, 2009.

(51) Int. Cl.
*G06F 7/04* (2006.01)
*G06F 17/30* (2006.01)
(Continued)

(52) U.S. Cl.
CPC ............... *G06F 21/85* (2013.01); *G06F 21/82* (2013.01); *G06F 21/00* (2013.01); *G06F 21/86* (2013.01)

(58) Field of Classification Search
CPC ......... G06F 21/00; G06F 21/82; G06F 21/85; G06F 21/86

USPC ............ 713/151, 152, 168, 189–194; 726/17, 726/26, 27, 29; 705/56; 380/202
See application file for complete search history.

(56) References Cited

U.S. PATENT DOCUMENTS

| 4,523,087 A | 6/1985 | Benton |
| 4,672,601 A | 6/1987 | Ablay |

(Continued)

FOREIGN PATENT DOCUMENTS

| WO | 2004105297 A2 | 12/2004 |
| WO | WO 2009047556 A1 * | 4/2006 |
| WO | 2009047556 A1 | 4/2009 |

OTHER PUBLICATIONS

Jones, D. et al, "Secure Data Export and Auditing Using Data Diodes", 2006, Department of Computer Science, University of Iowa, Iowa City, IA (http://www.divms.uiowa.edu/~jones/voting/diode/evt06paper.pdf).*

(Continued)

*Primary Examiner* — Daniel Potratz

(57) ABSTRACT

A rugged, integrated network interface appliance for ensuring secure data transfer comprising send-only network interface circuitry comprising a microprocessor, a program memory, a first host interface, and a first serial interface; receive-only network interface circuitry comprising a microprocessor, a program memory, a second host interface, and a second serial interface; a single data link connecting the first serial interface of the send-only network interface circuitry to the second serial interface of the receive-only network interface circuitry that is configured such that the send-only network interface circuitry is configured not to receive any data from said data link, and the receive-only network interface circuitry is configured not to send any data to said data link.

22 Claims, 4 Drawing Sheets

(51) Int. Cl.
*H04N 7/16* (2011.01)
*G06F 21/85* (2013.01)
*G06F 21/82* (2013.01)
*G06F 21/00* (2013.01)
*G06F 21/86* (2013.01)

(56) References Cited

U.S. PATENT DOCUMENTS

| | | | |
|---|---|---|---|
| 4,829,596 | A | 5/1989 | Barina |
| 5,039,194 | A | 8/1991 | Block et al. |
| 5,069,522 | A | 12/1991 | Block et al. |
| 5,136,410 | A | 8/1992 | Heiling et al. |
| 5,251,054 | A | 10/1993 | Lynn |
| 5,282,200 | A | 1/1994 | Dempsey et al. |
| 5,335,105 | A | 8/1994 | Carlton |
| 5,343,323 | A | 8/1994 | Lynn et al. |
| 5,495,358 | A | 2/1996 | Bartig et al. |
| 5,703,562 | A | 12/1997 | Nilsen |
| 5,769,527 | A | 6/1998 | Taylor et al. |
| 5,983,332 | A | 11/1999 | Watkins |
| 6,058,421 | A | 5/2000 | Fijolek et al. |
| 6,108,787 | A | 8/2000 | Anderson et al. |
| 6,262,993 | B1 | 7/2001 | Kirmse |
| 6,384,744 | B1 | 5/2002 | Philyaw et al. |
| 6,415,329 | B1 | 7/2002 | Gelman et al. |
| 6,498,667 | B1 | 12/2002 | Masucci et al. |
| 6,546,422 | B1 | 4/2003 | Isoyama et al. |
| 6,654,565 | B2 | 11/2003 | Kenny |
| 6,665,268 | B1 | 12/2003 | Sato et al. |
| 6,728,213 | B1 | 4/2004 | Tzeng et al. |
| 6,731,830 | B2 | 5/2004 | Lauder et al. |
| 6,792,432 | B1 | 9/2004 | Kodavalla et al. |
| 6,807,166 | B1 | 10/2004 | Ohura |
| 6,839,776 | B2* | 1/2005 | Kaysen ............... 710/36 |
| 6,925,257 | B2 | 8/2005 | Yoo |
| 6,934,472 | B2 | 8/2005 | Chang et al. |
| 6,940,477 | B2 | 9/2005 | Moon et al. |
| 6,988,148 | B1 | 1/2006 | Sheth |
| 7,016,085 | B2 | 3/2006 | Gonzalez et al. |
| 7,095,739 | B2 | 8/2006 | Mamillapalli et al. |
| 7,149,897 | B2 | 12/2006 | Chincheck et al. |
| 7,246,156 | B2 | 7/2007 | Ginter et al. |
| 7,260,833 | B1 | 8/2007 | Schaeffer |
| 7,339,929 | B2 | 3/2008 | Zelig et al. |
| 7,356,581 | B2 | 4/2008 | Hashimoto |
| 7,370,025 | B1 | 5/2008 | Pandit |
| 7,389,323 | B2 | 6/2008 | Tanimoto |
| 7,440,424 | B2 | 10/2008 | Nam et al. |
| 7,454,366 | B2 | 11/2008 | Kato |
| 7,512,116 | B2 | 3/2009 | Ohura |
| 7,529,943 | B1 | 5/2009 | Beser |
| 7,795,633 | B2* | 9/2010 | Ruhnau ............ H01L 31/0203 257/432 |
| 2002/0003640 | A1 | 1/2002 | Trezza |
| 2002/0076962 | A1* | 6/2002 | Williams ............... 439/188 |
| 2002/0118671 | A1 | 8/2002 | Staples et al. |
| 2003/0058810 | A1 | 3/2003 | Petronic |
| 2003/0119568 | A1 | 6/2003 | Menard |
| 2003/0195932 | A1 | 10/2003 | Tanabe et al. |
| 2004/0022539 | A1 | 2/2004 | Bannister et al. |
| 2004/0103199 | A1 | 5/2004 | Chao et al. |
| 2004/0131357 | A1 | 7/2004 | Farmer et al. |
| 2004/0236874 | A1 | 11/2004 | Largman et al. |
| 2005/0033990 | A1* | 2/2005 | Harvey ............ H04L 63/105 726/4 |
| 2005/0185961 | A1 | 8/2005 | Bhalla et al. |
| 2005/0201373 | A1 | 9/2005 | Shimazu et al. |
| 2005/0259587 | A1 | 11/2005 | Wakumoto et al. |
| 2006/0114566 | A1 | 6/2006 | Ohmori et al. |
| 2006/0153092 | A1 | 7/2006 | Matityahu et al. |
| 2006/0153110 | A1 | 7/2006 | Morgan et al. |
| 2006/0173850 | A1 | 8/2006 | Auer et al. |
| 2006/0209719 | A1 | 9/2006 | Previdi et al. |
| 2007/0041388 | A1 | 2/2007 | Russell |
| 2007/0204145 | A1* | 8/2007 | Bunn ............ H04L 63/0281 713/152 |
| 2007/0223158 | A1 | 9/2007 | Ma et al. |
| 2008/0008207 | A1 | 1/2008 | Kellum |
| 2008/0259929 | A1* | 10/2008 | Mraz ............ 370/395.1 |
| 2009/0024612 | A1 | 1/2009 | Tang et al. |
| 2010/0235561 | A1 | 9/2010 | Goldring |

OTHER PUBLICATIONS

Ball, Stuart, "Analog Interfacing to Embedded Microprocessors: Real World Design", 2001, v-vii; pp. 56-71.*
Jones, Douglas W., "RS-232 Data Diode—Tutorial and Reference Manual", Jul. 28, 2006, University of Iowa.*
"Veto Uni-directional Network Bridge and Data Pump Applications White Paper", UNB and DPA White Paper by Tenix Datagate Pty Ltd., 2002, pp. 1-6.
Westmacott, J., "Unidirectional Networking: GIAC Security Essential Certification Practical Assignment Version 1.46", Sans Institute, 2003.
Douglas W. Jones and Tom C. Bowersox, "Secure Data Export and Auditing Using Data Diodes," Department of Computer Science, University of Iowa, Iowa City, IA.
Douglas W. Jones and Tom C. Bowersox, "Secure Data Export and Auditing Using Data Diodes" (EVT 06 Data Diode Paper) Department of Computer Science, Univ. of Iowa, Iowa City, IA (http://www.usenix.orgievents/evt06/techfull_papers/jones/jones_html).
Douglas W. Jones and Tom C. Bowersox, "Secure Data Export and Auditing Using Data Diodes," Department of Computer Science, University of Iowa, Iowa City, IA (http://www.cs.uiowa.edu/~jones/voting/diode).
Douglas W. Jones, "RS-232 Data Diode—Tutorial and Reference Manual," University of Iowa, Jul. 28, 2006.
M. Anderson, C. North, J. Griffin, R. Milner, J. Yesberg, K. Yiu, "Starlight: Interactive Link," 1996, Defense Science & Technology Organisation, Salisbury, South Australia, Australia.
"Interactive Link White Paper," Jul. 27, 2001, Tenix Defence Pty Ltd., Mawson Lakes, South Australia, Australia.
Nilsen, Curt A., Information Security Implementations for Remote Monitoring; Symposium on Int'l Safeguards, Int'l Atomic Energy Agency, Vienna, Austria, Oct. 13-17, 1997.
Nilsen, Curt A. et al., the Secure Data Mirror; INMM; Nuclear Materials Management; vol. XXVII (No. 2), 39th Annual Mtg. Proceedings, Naples, FL, Jul. 26-30, 1998, pp. 1322-1327.
Kang, M.H. et al: "Design and Assurance Strategy for the NRL Pump," Computer, IEEE Service Center, Los Alamitos, CA, US, vol. 31, No. 4, Apr. 1998, pp. 56-63.
Moore, Andrew P.: "Network Pump (NP) Security Target," Naval Research Laboratory Washington DC 20375-5320, [Online], May 29, 2000, pp. 1-54, Retrieved from the Internet: URL:http://chacs.nrl.navy.mil/publications/CHACS/2000/2000moore-NPST.pdf> [retrieved on Jul. 30, 2012].
Kang M.H. et al: "A Network Pump," IEEE Transactions on Software Engineering, IEEE Service Center, Los Alamitos, CA, US, vol. 22, No. 5, May 1, 1996, pp. 329-338.
Kang M.H. et al: "An Architecture for multilevel secure interoperability," Computer Security Applications Conference, 1997. Proceedings., 13th Annual San Diego, CA, USA Dec. 8-12, 1997, Los Alamitos, CA USA, IEEE Comput. Soc, US, Dec. 8, 1997, pp. 194-204.
Davidson, J.A.: "Asymmetric Isolation," Computer Security Applications Conference, 1996., 12th Annual San Diego, CA, USA Dec. 9-13, 1996, Los Alamitos, CA, USA, IEEE Comput. Soc. US, Dec. 9, 1996, pp. 44-54.
Ball, Stuart, "Analog Interfacing to Embedded Microprocessors: Real World Design," (2001), v-vii; pp. 59-71.

* cited by examiner

RUGGEDIZED, COMPACT AND INTEGRATED ONE-WAY CONTROLLED INTERFACE TO ENFORCE CONFIDENTIALITY OF A SECURE ENCLAVE

FIELD OF INVENTION

The present invention relates to the security of data networks. More particularly, the present invention relates to a ruggedized, compact and integrated network appliance that uses dedicated send-only and receive-only network circuitry to provide controlled one-way data transfer to a secure enclave.

BACKGROUND OF THE INVENTION

Protection of computer or data networks from undesired and unauthorized data disclosure, interception or alteration has been a perennial concern in the field of computer and network security, for which firewalls and anti-spyware software have been developed to address security threats to computers and networks connected to the Internet and to protect them from possible cyberattacks, such as Trojan horse-type viruses or worms that may trigger undesired and unauthorized data disclosure by these computers and networks. However, for high security computer networks, such as those used by government agencies, intelligence communities, and certain commercial applications, conventional network security devices such as firewalls may not provide sufficiently reliable protection from undesired disclosure.

A high level of network security can be attained through the use of one-way data links, which isolate secure networks from security breaches (i.e. undesired and unauthorized data flow out of the secure network) while still allowing data from a low security environment to enter the network in a controlled manner. Various apparatus and methods have been developed for implementing one-way data transfer to a secure network.

Methods and systems for one-way data transfer include standard Internet firewalls as well as operating systems configured with specialized rules for restricted unidirectional information flow. Systems such as these are designed to have great flexibility, but are now being asked to perform strict unidirectional data transfer. The complexity of one-way data transfer is such that it is difficult to validate and verify that the controlled interface is not strictly one-way, failsafe and resistant to reconfiguration through administrator error or malicious intent. Additionally, it is difficult to prove in complex systems that data is not bypassing the one way security feature.

As an alternative to software-based one-way data transfer, hardware-based unidirectional interfaces may also be used. A common hardware based approach has been to cut the return lines of RS-232 serial interfaces and then spoof the two-way link layer protocols of a point-to-point Ethernet connection. By maintaining the unidirectional policy of the controlled interface in hardware, the one-way nature and non-bypassable operation of the device can be validated to a high degree of assurance. However, some designs in which the unidirectional aspect of the controlled interface is provided by cable configuration between the enclaves require additional mitigations to ensure against failure due to incorrect configuration.

Highly engineered solutions, such as the Owl Computing Technologies Dual Diode, (described in U.S. Patent. App. Pub. No. US 2008/0259929 A1, whose disclosure of a highly engineered hardware-based one way data link is incorporated herein by reference) provide a direct point-to-point optical link between the enclaves. The unidirectionality of the data transfer is enforced in the circuitry of the network interface cards at both enclave endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

Recent advancements in computers and electronics have enabled computer technology to be a routine part of front line military operations. Vehicles and foot soldiers now include multiple devices providing computer readable real-time information as to the status, locations and battle readiness of front line units. It is desirable that these devices remain part of an unclassified domain and communicate their information to a classified enclave for analysis and decision making, thereby simplifying storage, distribution, maintenance and operation of these devices.

Due to its failsafe, non-bypassable operation, a dual-diode approach to transferring data from frontline war fighters to a command and control network is highly desirable. However, existing approaches utilizing two servers and a one-way link across an optical fiber are too bulky and do not provide the level of ruggedness and protection from radio interception to be suitable for use by front line units. Additionally, the dispersed configuration of prior art systems for unidirectional data transfer, with multiple machines connected by cables makes them unsuitable for use by front units as the cables linking the send and receive machines are physically vulnerable to attack.

It is an object of the present invention to provide a ruggedized, compact, and integrated one-way network interface to ensure the confidentiality of a secure enclave.

It is yet another object of the present invention to provide a compact, ruggedized one-way network interface that is resistant to water, frost, vibration, and extremes in temperature.

It is yet another object of the present invention that the send and receive network circuitry of the network interface be physically separated and connected only through an optical interface.

It is yet another object of the present invention to provide a ruggedized network interface in which the ground and power planes are separated for complete isolation.

It is yet another object of the present invention to provide a ruggedized network interface in which the send-only and receive-only network circuitry are powered separately to achieve still further isolation.

It is yet another object of the present invention to provide a small, rugged and integrated network appliance that can provide a filtering or scan function to qualify data passing over a one-way data link.

It is yet another object of the present invention to provide a small, rugged and integrated network appliance for that uses two-way protocol interfaces to pace the data transfer across the unidirectional interface.

BRIEF DESCRIPTION OF THE DRAWINGS

The above and related objects, features and advantages of the present invention will be more fully understood by reference to the following detailed description of the preferred, albeit illustrative, embodiments of the present invention when taken in conjunction with the accompanying figures, wherein.

SUMMARY OF THE INVENTION

According to some embodiments, the present invention relates to a rugged, integrated network appliance for one-way data transmission from a low security domain such as a small tactical vehicle, foot soldier or weather station, to a high security enclave. The network appliance of the present invention may comprise a first set of network circuitry which is only capable of sending data, and a second set of network circuitry which is only capable of receiving data. The send-only network circuitry may be connected to the receive-only network via a single data link. As neither set of network circuitry is capable of both sending and receiving data, it is physically impossible for data flow to go in any direction except from the send side to the receive side. Additionally, the componentry of the network appliance may be housed in a compact, integrated package that provides the necessary durability for the front line environment and which is resistant to tampering, environmental conditions and radio monitoring.

DETAILED DESCRIPTION OF THE PREFERRED EMBODIMENTS

Figure 1:
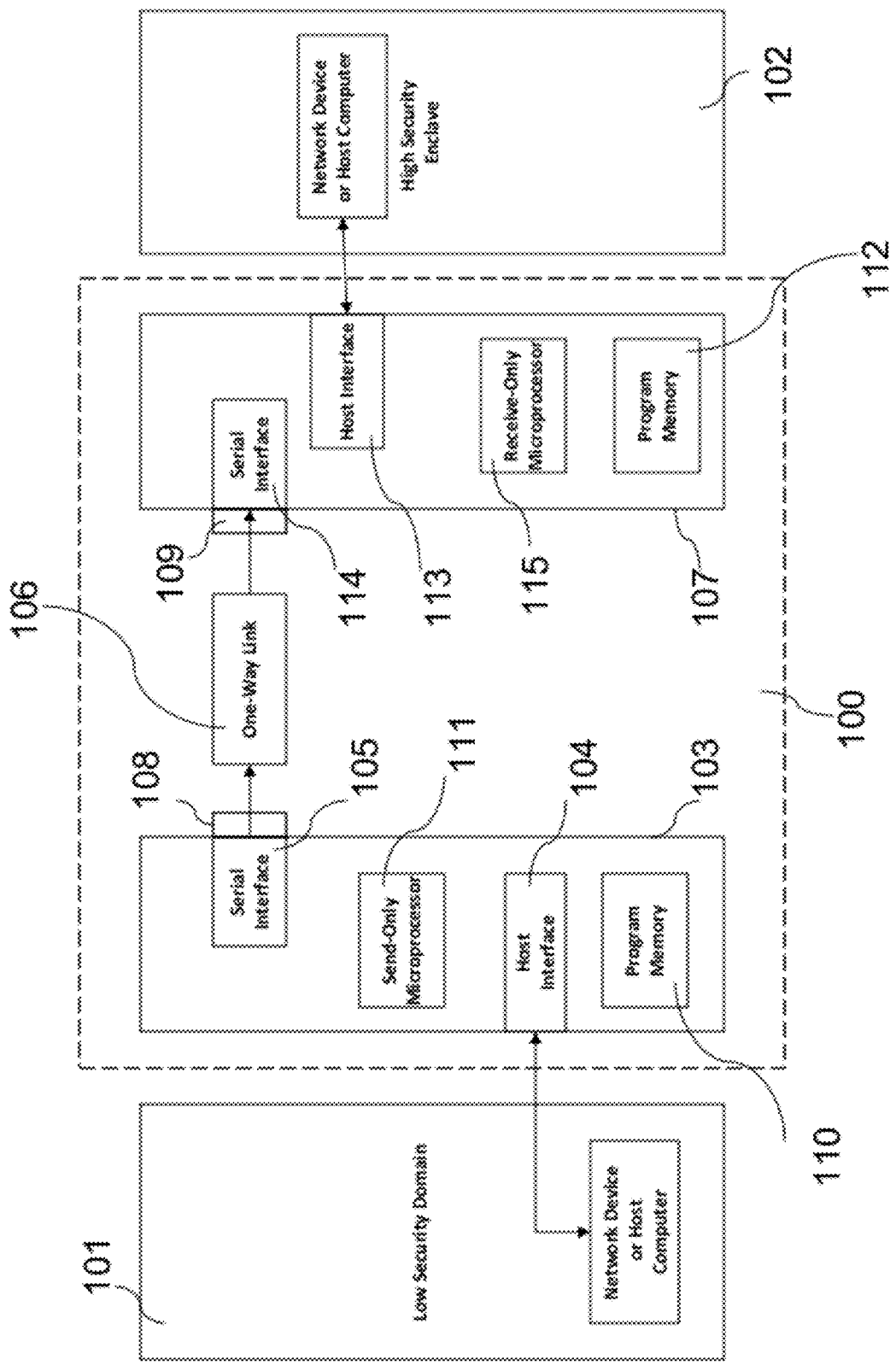
FIG. 1 schematically illustrates a network appliance according to one embodiment of the present invention.

Illustrated in FIG. 1 is a schematic diagram of an embodiment of the present invention 100 for ensuring secure one-way data transmission from a low security domain 101 to a classified enclave 102. The system may operate on various operating systems or computing platform types, such as Microsoft Windows and the Unix-based operating systems (e.g., Solaris, Ultrix and Linux). Data from low security domain 101 is received by send-only network circuitry 103 via a host interface 104, which may be an Ethernet interface, USB, optical or serial interface based on the RS-232 standard and FireWire connectors (e.g., FireWire 400 or FireWire 800 connectors) based on the IEEE 1394 standard. These connectors may be plugged into corresponding standard sockets in the host computers and devices of the low security domain 101 and may also be used to power the network circuitry of the present invention. In some embodiments, the host interface 104 may use hardened connectors, which may be military specification connectors approved for use in the Future Combat Systems ("FCS") program. The send-only network circuitry may include a first serial interface 105 for connection to receive-only network circuitry 107 via a single data link 106. In some embodiments, the send-only network circuitry may also comprise program memory 110 and a microprocessor 111. Other embodiments, in which the processing functions performed by microprocessor 111, are performed by software, a state machine, and other processing means are also possible.

The one-way data link 106 may comprise an optical isolator that includes an optical emitter 108 and an optical detector 109. In such embodiments, the send-only network circuitry 103 does not have any photodetection equipment and, likewise, the receive-only network circuitry 107 does not have any photoemission circuitry, there is therefore no possibility of reverse data flow. In this way, the unidirectionality of data flow from the low security domain 101 to the high security enclave 102 may be strictly enforced. While data link 106 may comprise an optical fiber coupled to a photoemitter 108 and a photodetector 109, it will be realized that other embodiments are possible. For example, data link 106 may comprise a STP communication cable or a trace on a printed circuit board.

The receive-only network circuitry 107, which, according to some embodiments, largely mirrors send-only circuitry 103, comprises a second serial interface 114, a microprocessor 115, program memory 112, and a second host interface 113. Other embodiments, in which the processing functions performed by microprocessor 115, are performed by software, a state machine or other processing means are also possible. Second host interface 113 connects receive-only network circuitry to high security enclave 102. Like first host interface 104, second host interface 113 may be an Ethernet interface, USB interface, or an optical or serial interface based on the RS-232 standard and FireWire connectors (e.g., FireWire 400 or FireWire 800 connectors) based on the IEEE 1394 standard. These connectors may be plugged into corresponding standard sockets in the host computers and devices of the high security enclave 102 and can also be used to power the network circuitry of the present invention. In some embodiments, the host interface 113 uses hardened connectors, which may be military specification connectors approved for use in the Future Combat Systems ("FCS") program.

In some embodiments of the present invention, the unidirectionality of data flow from the send side to the receive side may be further enforced by software residing in program memories 110 and 112. For example, in embodiments in which host interfaces 104 and 113 are USB interfaces, unique product identifications, based on the CDC/ACM class codes used for USB to serial device emulation may be assigned to send-only circuitry 103 and receive-only circuitry 107. Operating systems residing on program memories 110 and 112, can then be configured such that each USB interface can only communicate with devices having predetermined product identifications. By configuring each USB interface to communicate only with preselected devices, network appliance 100 cannot be used to transfer data from the receiving network to a send network by "reversing" the connections to the USB interfaces, by connecting a device on the receiving network to the send-side host interface 104. That is, such changes in the software residing in program memories 110 and 112, may be used to further reinforce the unidirectionality of the data flow from the sending network to the receiving network.

One-way data flow from the low security domain 101 to the high security enclave 102 through an exemplary embodiment of the present invention 100 can be described as follows: Data to be transmitted from the low security domain 101 may first be transferred to the send-only network circuitry 103 of the present invention via first host interface 104. The data may then be transferred by microprocessor 111 operating under the control of commands stored in program memory 110 to first serial interface 108, and transmitted across one-way data link 106. The transmitted data is received by second serial interface 109 and transferred by microprocessor 115 operating under the control of commands stored in program memory 112 to second host interface 115. From there, the data may be uploaded to machines residing in the high security enclave 102.

According to some embodiments, both the send-only network circuitry 103 and receive-only network circuitry 104 may be configured to implement two-way data transmission protocols to pace the flow of data across the one-way data link. One method of implementing two-way protocols may be through the use of TCP/IP socket-based proxy software residing in both the send-only program memory 110 and the receive-only program memory 112. In some embodiments, the TCP proxy application in the send-only program memory 110 may fully implement TCP/IP based bilateral communications between send-only network circuitry and the low security domain 101. TCP session managing applications in send-only program memory 110 may emulate the handshaking and control protocols used in bilateral TCP communications. In this way, the send-only network circuitry 103 may communicate with the host computer in low security domain 101 to regulate the flow of data across the one-way interface. Similarly, the receive-only network circuitry 107 may be configured to include TCP/IP socket-based proxy software in program memory 112 for communicating with a host computer in secure enclave 102. By implementing two-way protocols such as those described above, transmission speeds of 1 Mbps or more may be attained.

Figure 2A:
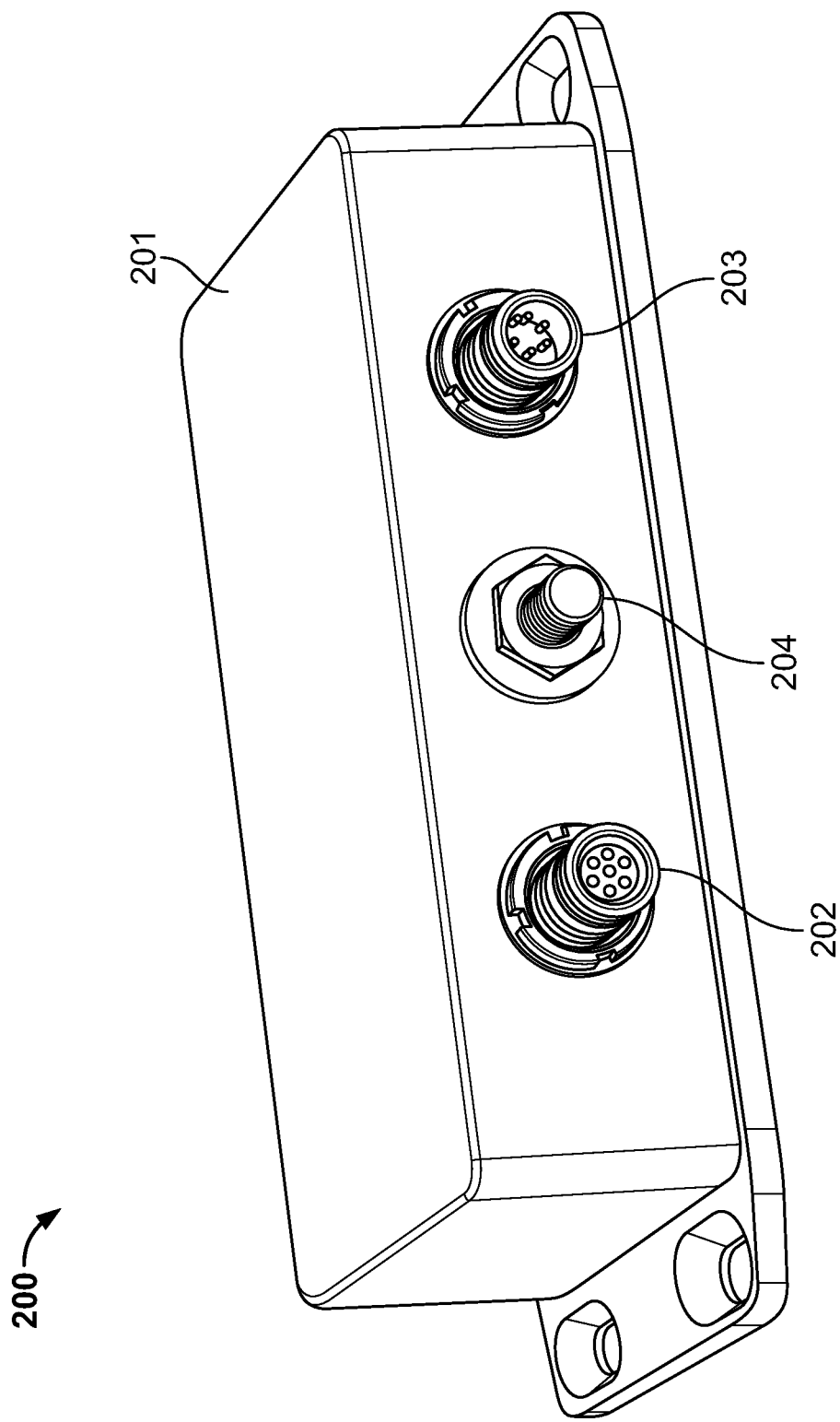
FIG. 2A provides an external view of an exemplary embodiment of the present invention.
Figure 3:
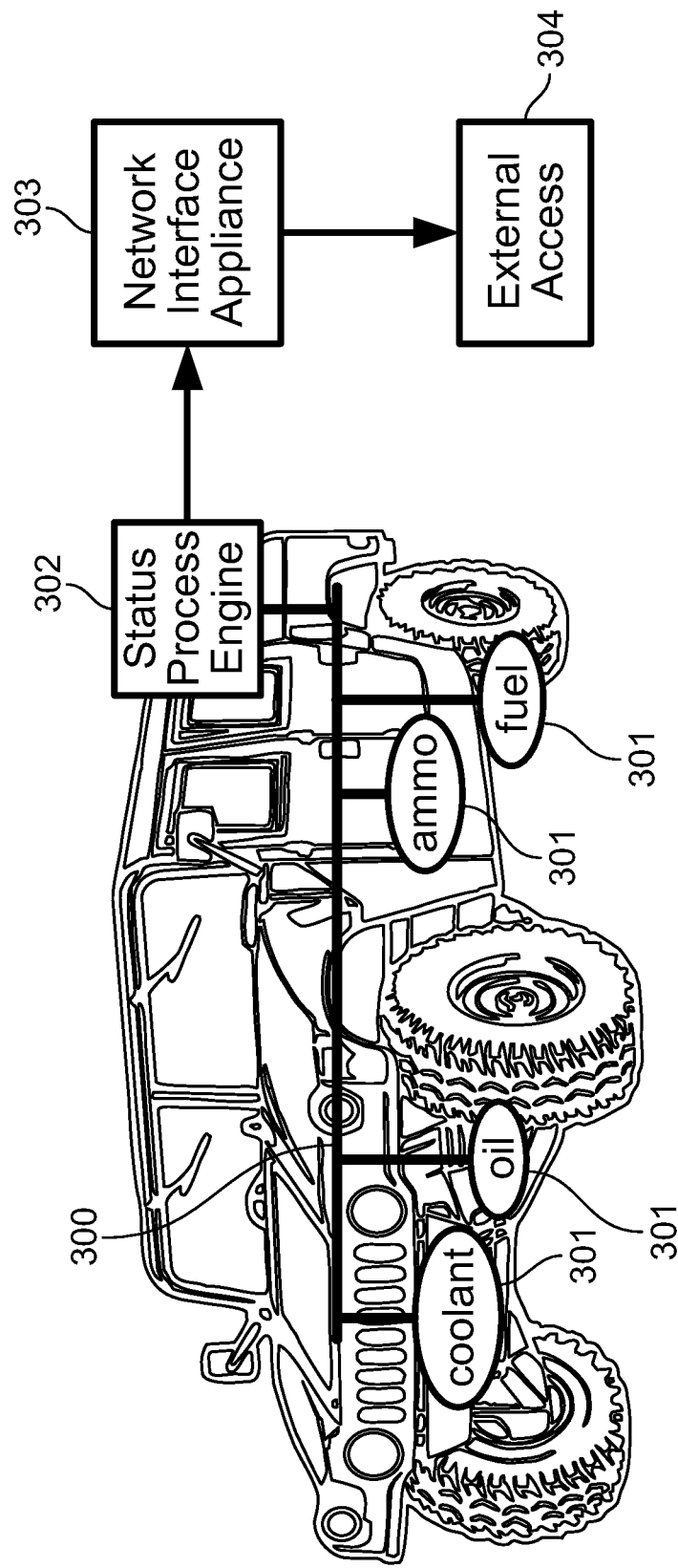
FIG. 3 provides a schematic diagram of a still further embodiment of the present invention.

It will be realized by persons of skill that the basic architecture of the network interface appliance of the present invention described above is flexible and lends itself to a variety of embodiments depending on the application. FIGS. 2A & B and FIG. 3 are directed to a particularly exemplary embodiment of the present invention suitable for transmitting status information (e.g., engine temperature, available fuel, oil pressure, available ammunition, occupants' heart rates, etc.) from a low security domain, such as the local area network of a light tactical vehicle (e.g., a HMMWV), to a secure command-and-control ("C2") network. With reference to FIG. 2A, all of the circuitry of the present invention 200 may be contained within a small, sealed, ruggedized housing 201, which may be constructed of steel, aluminum, titanium, composite or any other suitable material. In some embodiments, housing 201 may be resistant to vibration, frost, extremes in temperature and other environmental hazards. In other embodiments, it may be desirable to weld or otherwise permanently close housing 201 to further protect the device from tampering and external contaminants. In particularly preferable embodiments, the housing should be able withstand being frozen in a block of ice without any effect on system performance.

According to some embodiments, connectors for the send-only host interface 202, the receive-only host interface 203, and system ground 204 may be disposed on housing 201. In some embodiments of the present invention, host interfaces 202 and 203 may be FCS connectors which have been keyed male and female to prevent incorrect configuration.

Figure 2B:
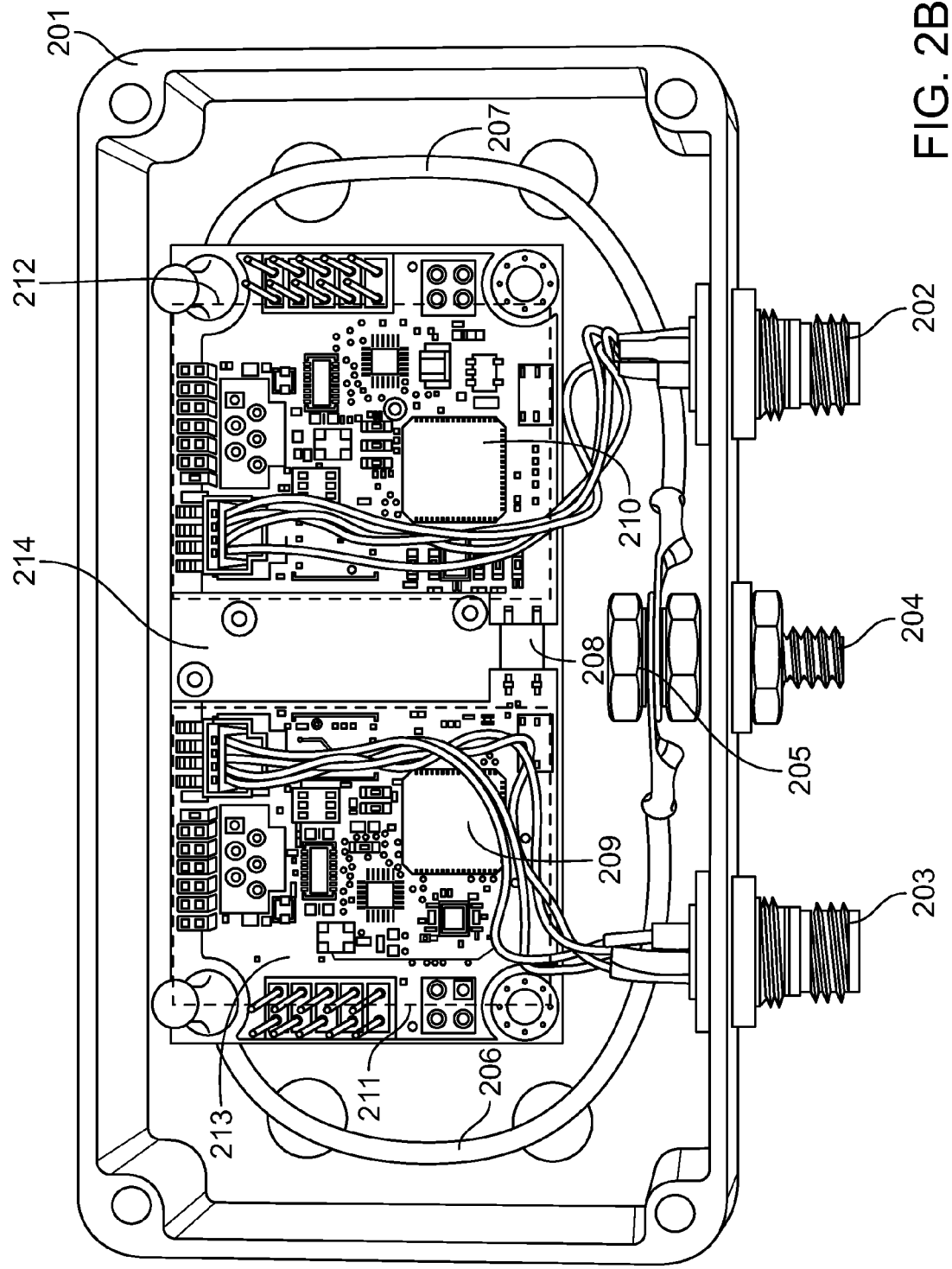
FIG. 2B provides an internal view of an exemplary embodiment of the present invention.

The internals of an embodiment of the present invention are described with reference to FIG. 2B. As shown in FIG. 2B, the send-only network circuitry 212 and the receive-only network circuitry 211 may be disposed at opposite ends of a single military specification printed circuit board 213 mounted within housing 201 and may be physically segregated by a relatively wide region of unprinted, unpopulated circuit board 214. The send-only network circuitry 212 and receive-only network circuitry 213 may be connected only through an optical interface 208. Optical interface 208 may be an industrial component used for electrical isolation.

Further separation of the send and receive circuitry may be obtained by independently powering the two sets of network circuitry through host interfaces 202 and 203. In this way, the power and ground planes of the system may be separated and the system may be made resistant to "listening" by radio antennas. The system may be also be protected against electrostatic discharge by connecting send-only network circuitry 212 and receive-only network circuitry 211 to system ground interface 204 via wires 206 and 207. According to some embodiments, wires 206 and 207 may be of heavy gauge. In some embodiments, the send-only microprocessor 111 and program memory 110 may also reside on a single chip 209. Similarly, the receive-only microprocessor 115 and program memory 112 reside on a single chip.

As shown in FIG. 3, according to one embodiment, sensors 301 disposed in a fighting vehicle may be connected to internal vehicle LAN 300 and status process engine 302 to form a low security domain. In this embodiment, data from the sensors 301 may be transmitted via LAN 300 and status process engine 302 to the host interface of embedded network appliance of the present invention 303, where it can be uploaded via an access point 304, which may comprise a USB interface or radio, to a high security domain.

In addition to providing situational data from a tactical vehicle to a high security network as described above, other particularly suitable battlefield applications for the present invention include relaying situational data from dismounted soldiers and unmanned aerial vehicles to high security networks.

Given their small profile, low weight and extreme ruggedness, embodiments of the present invention may also be carried by a dismounted foot soldier and connected to sensors disposed in and on the soldier's person and equipment. In this way, the network interface of the present invention can collect and relay relevant status information such as the soldier's location, heart rate, remaining ammunition, etc. to a high security network.

The advent of unmanned aerial vehicles ("UAVs"), also known as drones, has greatly increased both the reconnaissance and strike capabilities of the modern army while at the same time decreasing the risk to individual soldiers. However, the proliferation of UAVs on the modern battlefield, in particular UAVs controlled by operators outside of a central command post, has created unique command and control problems that have not been addressed by the prior art. In contrast to a helicopter or airplane pilot who can readily scan the sky for aircraft and other obstacles with his eyes, the UAV operator's awareness of other UAVs and aircraft is generally limited to a video feed from cameras on the UAV. This relative lack of situational awareness afforded UAV operators has resulted in mid-air collisions between UAVs, and promises to be an ever-greater problem as the number operating in the modern battlefield increases.

Embodiments of the present invention may be applied to solve the problem of mid-air collisions between UAVs caused by inadequate situational awareness of other aircraft by providing a secure link by which flight data, such as the location, speed, and altitude from a UAV operated by a controller in a low-security environment, such as in the field, can be uploaded to a high security command and control network that can coordinate the movements of multiple UAVs in the theatre of operations.

In some embodiments of the present invention, send-only program memory 110 and/or receive-only program memory 112 may be configured to scan and/or filter data passing through the interface, thereby adding an additional layer of security to the transmission to the high security enclave. The send-only microprocessor 111 and receive-only microprocessor 112 of the present invention may be configured to perform a filtering or scan function to qualify data passing across the one-way data link 106. In this way, the processor may confirm whether the data passing across the one-way data link is entirely of the desired type, and that unwanted data has not been embedded in the transmission. For example, in some embodiments, either the send or receive-side program memories may be configured to filter text data by comparing it against ASCII characters, to confirm that the data only contains text information. In other embodiments, GPS information may be filtered based on its adherence to the NMEA 0183 protocol. It will be appreciated that, while the present invention has been described in applications where it is being used as an "up guard" for moving data from a low security domain to a secure enclave, the invention may also function as a "down guard" for moving data in the opposite direction, from a high security domain to a low security network.

In embodiments wherein the data from the low security domain comprises documents in extensible markup language ("XML") format, the filtering of data passing across data link 106 may be accomplished by implementing XML schema. An XML schema is a type of XML document expressed in terms of constraints on the structure and content of the documents of that type, above and beyond the basic syntactical constraints required by XML language itself. Suitable XML schema languages for use with embodiments of the present invention include XML Schema (W3C) and Relax NG. A schema provides a set of constraints to which documents passing through the interface must conform. An XML parser may "validate" documents by checking for their conformity to the constraints of the schema. The constraints of the schema may be structural, requiring that documents have particular structural constraints, (e.g., that the document must include temperature or location data.). Where a document does not conform to the requirements of the schema, it may be erased or otherwise prohibited from passing across the one-way data link. The schema validation may be performed by any parser known in the art, such as JAXB (Java Architecture for XML Binding) or SAX (Simple API for XML). Depending on the end-user's needs, the schema may be programmed at the factory onto a user-inaccessible portion of program memory 110 and/or 112, thereby enhancing the security of the link by making the schema tamper-proof. Alternately, the system can be configured such that the schema can be user-defined and modified as necessary.

According to some embodiments of the present invention, data in XML document format from several sources in a low-security domain, such as a field weather station or sensors disposed within a tactical vehicle, may be transferred to the network interface appliance of the present invention configured to implement XML schema. The schema can be defined such that only data validated as having the structural constraints required by the schema, (e.g. for a temperature sensor, the data must be a temperature within a particular range, or include indicia to for verifying its authenticity) may be passed across the one-way link. Further refinements, in which XML documents may be assigned to different transmission channels, may also be possible.

While this invention has been described in conjunction with the exemplary embodiments outlined above, it is evident that many alternatives, modifications and variations will be apparent to those skilled in the art. Other embodiments include: tamper evident configurations in which the circuitry is potted in epoxy; embodiments adapted for use by field soldiers in which the device is powered by batteries or solar power; embodiments in which the network circuitry includes flash memory for logging status messages; and embodiments in which a programming interface is provided which allows the program memory to be updated to improve performance and/or enhance the filtering scheme. Accordingly, the exemplary embodiments of the invention, as set forth above, are intended to be illustrative, not limiting. Various changes may be made without departing from the spirit and scope of the invention.

What is claimed is:

1. A ruggedized network interface appliance for ensuring secure data transfer comprising:
    send-only network interface circuitry comprising a processor, a program memory, a first host interface, and a first serial interface;
    receive-only network interface circuitry comprising a processor, a program memory, a second host interface, and a second serial interface;
    a single data link connecting the first serial interface of the send-only network interface circuitry to the second serial interface of the receive-only network interface circuitry;
    wherein the send-only network interface circuitry is configured not to receive any data from said data link, and said receive-only network interface circuitry is configured not to send any data to said data link; and
    wherein the send-only network circuitry and the receive-only network circuitry reside on a single circuit board,
    wherein the single circuit board has three separate contiguous areas, a first area containing the send-only network circuitry, a second area containing the receive-only network circuitry and a third area disposed directly between the first area and the second area containing no electrical connections between the first area and the second area, and
    wherein the single data link comprises only a single optical isolator device which spans the third area but has no connection thereto.

2. The network interface appliance of claim 1 wherein said data link is an optical link.

3. The network interface appliance of claim 1 wherein at least one of said host interfaces is a USB interface.

4. The network interface appliance of claim 1 wherein at least one of said host interfaces is an Ethernet interface.

5. The network interface appliance of claim 1 wherein at least one of said host interfaces is a RS-232 interface.

6. The network interface appliance of claim 1 wherein the network interface appliance has a data throughput of at least 1 Mbps.

7. The network interface appliance of claim 1 wherein at least one of the first host interface and the second host interface uses a ruggedized connector.

8. The network interface appliance of claim 7 wherein the ruggedized connector is keyed to physically enforce the unidirectionality of the data flow.

9. The network interface appliance of claim 1 wherein the send-only and receive-only circuitry are configured to filter data passing through the network interface appliance.

10. The network interface appliance of claim 9 wherein the filtering is performed in the send-only circuitry.

11. The network interface appliance of claim 9 wherein the filtering is performed in the receive-only circuitry.

12. The network interface appliance of claim 9 wherein the data passing through the network interface appliance comprises Extensible Markup Language (XML) documents.

13. The network interface appliance of claim 12 wherein the filtering is accomplished using XML schema.

14. The network interface appliance of claim 13 wherein the filtering is configured such that documents conforming to preselected XML schema are assigned to preselected channels.

15. The network interface appliance of claim 14 wherein the channels through which the documents conforming to preselected XML schema can pass are user programmed via the first host interface.

16. The network interface appliance of claim 9 wherein the filtering can be user-configured via a connection to the first host interface.

17. The network interface appliance of claim 1, further comprising a single ruggedized housing, wherein all of the send-only network interface circuitry, the receive-only network interface circuitry and the single data link are contained within the housing.

18. The network interface appliance of claim 1 wherein the send-only and/or receive-only network circuitry implement bidirectional transfer protocols to pace data flow across the data link.

19. The network interface appliance of claim 18 wherein at least one of the send-only network interface circuitry and receive-only network interface circuitry implements TCP/IP protocols to pace data flow across the data link.

20. The network interface appliance of claim 18 wherein a software proxy application is used to implement bidirectional transfer protocols to pace data flow across the data link.

21. The network interface appliance of claim 1 wherein the unidirectionality of the data link is further maintained by software residing in said program memories.

22. The network interface appliance of claim 1, wherein the single circuit board and the send-only circuitry and receive-only circuitry residing on the single circuit board are potted in a solid material.

* * * * *